(12) United States Patent
Fresnel

(10) Patent No.: US 6,254,139 B1
(45) Date of Patent: Jul. 3, 2001

(54) SECURITY COVER FOR OBJECTS, PARTICULARLY FOR CONTAINERS WITH CLOSING DEVICE

(75) Inventor: Eric Fresnel, Paris (FR)

(73) Assignee: Sleever International Company, Morangis (FR)

(*) Notice: Subject to any disclaimer, the term of this patent is extended or adjusted under 35 U.S.C. 154(b) by 0 days.

(21) Appl. No.: 09/269,512

(22) PCT Filed: Oct. 1, 1997

(86) PCT No.: PCT/FR97/01731

§ 371 Date: Mar. 29, 1999

§ 102(e) Date: Mar. 29, 1999

(87) PCT Pub. No.: WO98/15939

PCT Pub. Date: Apr. 16, 1998

(30) Foreign Application Priority Data

Oct. 7, 1996 (FR) .................................................. 96 12181

(51) Int. Cl.⁷ .................................................. B42D 15/00
(52) U.S. Cl. .................................. 283/94; 283/72; 283/98; 283/86
(58) Field of Search .................................. 283/79, 80, 81, 283/94, 67, 70, 101, 105, 86; 215/246

(56) References Cited

U.S. PATENT DOCUMENTS

| | | | |
|---|---|---|---|
| 5,411,295 | * | 5/1995 | Bates et al. ............................ 283/81 |
| 5,551,729 | * | 9/1996 | Morgan ................................. 283/94 |
| 5,762,377 | * | 6/1998 | Chamberlain ......................... 283/67 |
| 6,113,720 | * | 9/2000 | Fresnel ................................. 215/246 |

FOREIGN PATENT DOCUMENTS

| | | |
|---|---|---|
| 0 585 076 A2 | 3/1994 | (EP) . |
| 0 698 562 A1 | 2/1996 | (EP) . |
| 2 273 492 | 6/1994 | (GB) . |
| 2 298 391 | 9/1996 | (GB) . |

* cited by examiner

Primary Examiner—Willmon Fridie, Jr.
(74) Attorney, Agent, or Firm—Nixon Peabody LLP; Stuart J. Friedman

(57) ABSTRACT

The invention relates to a security envelope (20) for an article, the envelope being constituted by a sleeve (21) of heat-shrinkable plastics material that is fitted on its inside face with a holographic element (30) and with a tear strip (22) passing behind said holographic element (30). According to the invention, the holographic element (30) is organized to be transferable onto the facing wall (13) of the article and to adhere to said wall via zones situated on either side of the tear strip (22) so as to hold a portion of said tear strip captive, such that any fraudulent manipulation of the envelope heat-shrunk onto the article has the effect of displacing the tear strip (22) and consequently of automatically and visibly destroying the transferred holographic element (30).

17 Claims, 3 Drawing Sheets

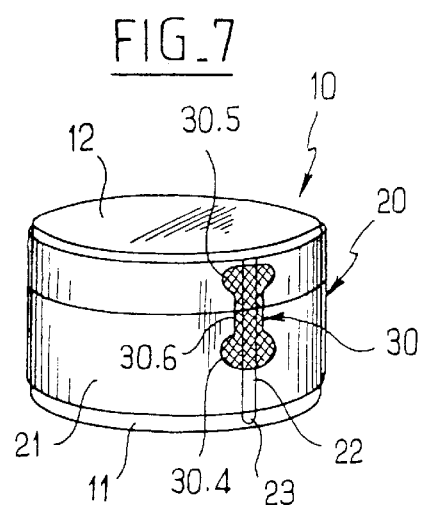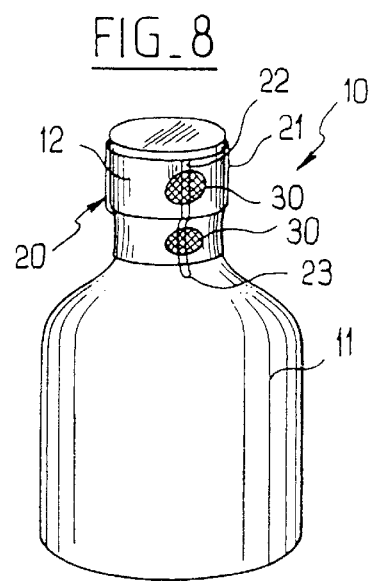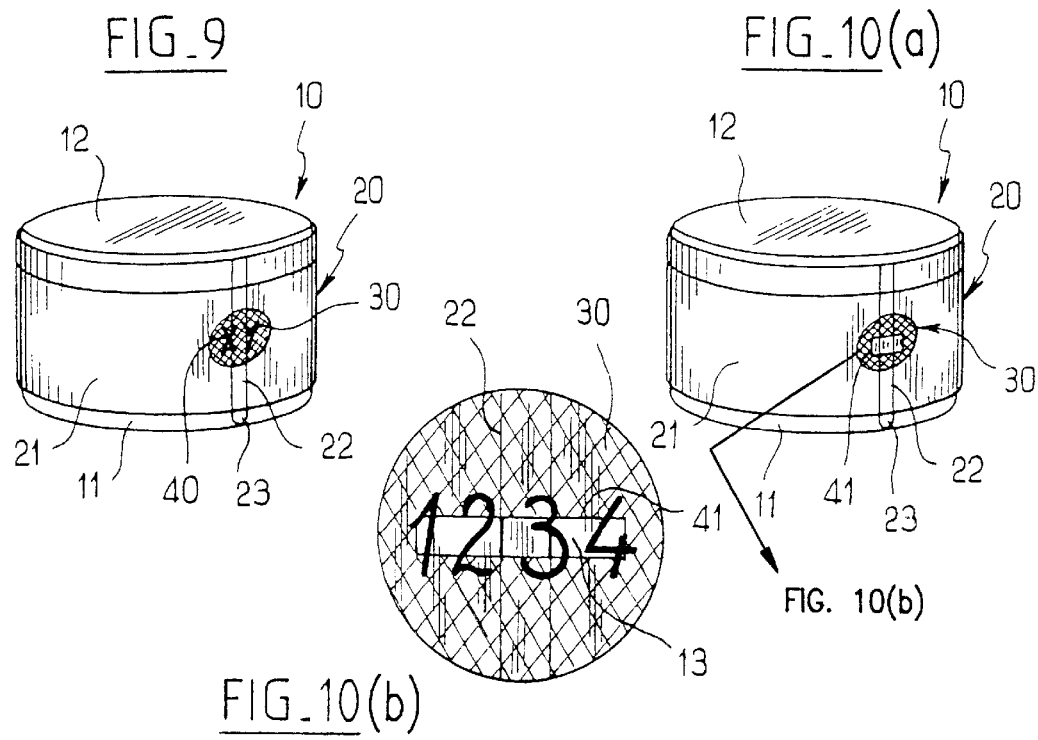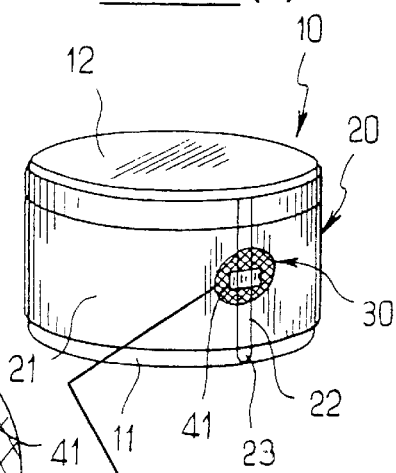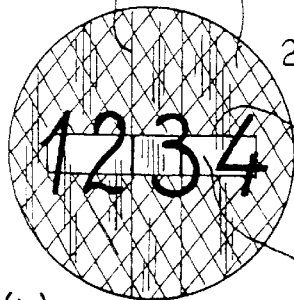

SECURITY COVER FOR OBJECTS, PARTICULARLY FOR CONTAINERS WITH CLOSING DEVICE

BACKGROUND OF THE INVENTION

The present invention relates to the field of packaging articles, and in particular the field of packaging consumer products such as foods, chemicals, cosmetics, or pharmaceuticals, e.g. presented in the form of a receptacle having a closure device. More precisely, the invention relates to a security envelope for an article, particularly but not exclusively for a receptacle having a closure device, the envelope being of the type constituted by a sleeve of heat-shrink plastics material suitable for being fitted closely around a portion of the article.

Such security envelopes have been known for a long time, particularly in association with the necks of bottles, where they are intended to guarantee tamper-proofing for the consumer, by guaranteeing that the product concerned has not been subjected to fraudulent substitution or has not been maliciously tampered with. The security envelope is then conventionally in the form of a sleeve fitted with a tear strip, with the strip making it possible, by applying traction to one end thereof, to open the envelope in order to gain access to the closure device of the receptacle. Tampering is sometimes made more easily visible by having micro-perforations present in a particular pattern in the wall of the sleeve so that any attempt at forcibly pulling off the heat-shrunk envelope causes it to be torn and complicates putting it back into place on the receptacle.

Document GB-A-2 298 391 describes a security envelope of heat-shrink plastics material that is fitted on its inside face with a transferable hologram strip, and optionally with a tear strip disposed in the vicinity of and parallel to the hologram strip. The tear strip serves solely to provide the conventional function of making the envelope easier to tear, and does not contribute in any way to the security function which is provided by the hologram strip.

Document GB-A-2 273 492 describes the use of a hologram tear strip (i.e. the tear strip then itself carries the hologram) which is stuck to the inside face of a heat-shrink sleeve, with a line of perforations provided through both the strip and the wall of the sleeve. It should be observed that the free face of the strip is naturally not adhesive, so that when the sleeve is opened, the two separated portions of the strip remain associated with the walls of the sleeve.

Documents EP-A-0 585 076 and JP-A-08 022250 describe a technique very similar to the preceding technique, with a holographic strip stuck to the inside face of a heat-shrink sleeve. The free face of the strip is coated in a thickness of silicone (for roll packaging) so that the hologram is not transferable.

Proposals have also been made to make security envelopes in which the sleeve is fitted on its inside face with a holographic element and with a tear strip that passes behind the holographic element so as to tear said element when the envelope is opened by pulling on said strip.

Under such circumstances, the inside wall of the heat-shrink plastics material sleeve carries a holographic element made in the form of a patch and stuck directly to the inside wall of the sleeve, the patch having a layer of holographic metallization carried by a support layer of transparent plastics material adhering to the inside face of the sleeve. The zone affected by the tear strip is then in direct contact with the layer of holographic metallization. With such a security envelopes, when the user exerts traction on the end of the tear strip to open the envelope, the tear strip tears the side wall of the sleeve progressively and digs a gap in the holographic element when the separation zone reaches this element. Once the tear strip has been completely removed, the safety envelope can be opened, and the holographic element carried by said envelope is split into two segments each remaining on the inside wall of the envelope, on either side of the gap.

Such a holographic element is designed to constitute a certificate of origin for the product.

However, such a security envelope does not provide a genuine indication of tampering, particularly because the sleeve can be removed by sliding or cutting and then replaced by another envelope fitted on the inside with another holographic element that is identical or analogous to the original element. In some cases, the dishonest person can even unstick the original holographic element if it is very difficult to reproduce so as to stick it back on a new support which is then put back on the article.

SUMMARY OF THE INVENTION

The invention seeks specifically to solve that technical problem by making it possible in completely reliable manner to detect any fraudulent or abnormal manipulation of the security envelope having a holographic element, so as to provide the consumer with a total guarantee.

An object of the invention is thus to provide a security envelope of the above-specified type whose structure makes it possible in totally reliable manner simultaneously to certify an origin and to indicate whether tampering has taken place by making visible any fraudulent or abnormal manipulation of the envelope that has been shrunk onto the article.

According to the invention, this problem is solved by a security envelope for an article, in particular a receptacle having a closure device, the envelope being of the type constituted by a sleeve of heat-shrinkable plastics material suitable for closely surrounding a portion of the article, said sleeve being also fitted on its inside face with a holographic element and a tear strip passing behind the holographic element so as to tear said element when the envelope is opened by pulling on said strip, wherein the holographic element is organized to be transferable onto the facing wall of the article and to adhere to said wall via zones situated on either side of the tear strip so as to hold a portion of said tear strip captive, such that any fraudulent manipulation of the envelope once shrunk on the article has the effect of displacing the tear strip and consequently of automatically and visibly destroying the transferred holographic element.

Thus, contrary to the prior technique in which the two portions of the holographic element that are obtained by applying traction to the tear strip being fixed to the sleeve, these two portions of the holographic element now remain indissociably associated with the article because they have been transferred onto the wall thereof and because they adhere to said wall. When a consumer pulls on the tear strip to open the security envelope of the invention, the consumer can see that the two residual portions of the holographic element are still adhering to the wall of the article, thus guaranteeing that the acquired product is indeed an original. Furthermore, if the security envelope shrunk onto the article has been subjected to fraudulent or abnormal manipulation, the thin and fragile holographic element (thickness of the order of a few microns) is automatically destroyed by the fact that it is disposed in intimate connection with the wall of the article while also holding the tear strip captive: any displacement of the sleeve, whether axially, circumferentially, or obliquely, will take the tear strip with it since it is intimately bonded thereto, and will consequently impart relative displacement between the holographic element and the tear strip, which leads to the holographic element being destroyed. The tear strip imprisoned in this way between the holographic element and the wall of the article thus serves as a force transmitter and as a member for destroying the holographic element in the event of the shrunk-on envelope being subjected to fraudulent manipulation.

The holographic element can be organized so that its corresponding zones are transferred onto the wall of the article when the sleeve is heat-shrunk, either in full or, in a variant, in part only in a predetermined pattern. In either case, at least a portion of the holographic element is transferred to the wall of the article, and after the security envelope has been opened it will thus be visible in order to perform its function as a certificate of origin.

When the security envelope is associated with a receptacle whose closure device includes a stopper or a cap surmounting a body of the receptacle, the holographic element is transferred during heat shrinking onto the side wall of the receptacle, or in a variant onto the side wall of the stopper or cap itself, or even onto both simultaneously. In the latter case, provision can also be made for the holographic element to be elongate in shape, defining two patches interconnected by a ligament, with one patch being transferred onto the side wall of the receptacle body and one patch being transferred onto the side wall of the stopper or cap.

Provision can also be made for the holographic element and the adjacent zone of the wall of the sleeve shrunk onto the article to present local marking, in particular a code, made by radiation such as laser radiation. In which case, advantageously, provision is made for the holographic element to have a window making it possible also to mark the adjacent zone of the wall of the article.

In a particular embodiment, the holographic element fitted to the sleeve comprises a layer of holographic metallization carried by a support layer of transparent plastics material adhering to the inside face of said sleeve, the layer of holographic metallization presents, on its free face, a layer of reactivatable adhesive, and said layer of holographic metallization is bonded to the support layer by a transfer bonding layer enabling said layer of holographic metallization to be totally or partially dissociated therefrom for transfer onto the wall of the article, and enabling it to be stuck to said wall when the adhesive layer is reactivated.

The adhesive layer provided on the free face of the layer of holographic metallization is preferably reactivatable by heat, which facilitates transferring and sticking said layer of metallization on the wall of the article.

Depending on circumstances, it is also possible for the tear strip to have a width sufficient to destroy the transferred holographic element by forming a wide gap, thereby facilitating visual detection of fraudulent manipulation.

It is also possible to provide for the tear strip also to carry a metal filament extending lengthwise relative to said strip, said filament constituting an antenna associated with an electronic system for surveillance against theft and operating on a magnetic detection principle.

By way of example, the holographic element may have an appearance that is predominantly silver-colored or gold-colored.

Finally, it is also possible to provide for a single sleeve to be fitted with a plurality of transferable holographic elements, with the tear strip passing behind each holographic element.

BRIEF DESCRIPTION OF THE DRAWINGS

Other characteristics and advantages of the invention appear more clearly in the light of the following description and the accompanying drawings which relate to a particular embodiment, and in the figures of which:

FIG. 7 shows a variant of the holographic element shaped specially to extend astride the line of separation between the body and the cap of the article;

FIG. 8 shows another variant having two holographic elements disposed on either side of the above-specified line of separation;

FIG. 9 shows yet another embodiment with localized laser marking.

FIGS. 10(a) and 10(b) show a variant of the embodiment of FIG. 9 using a holographic element with a window for locally marking the wall of the article.

DETAILED DESCRIPTION OF THE INVENTION

Figure 1:
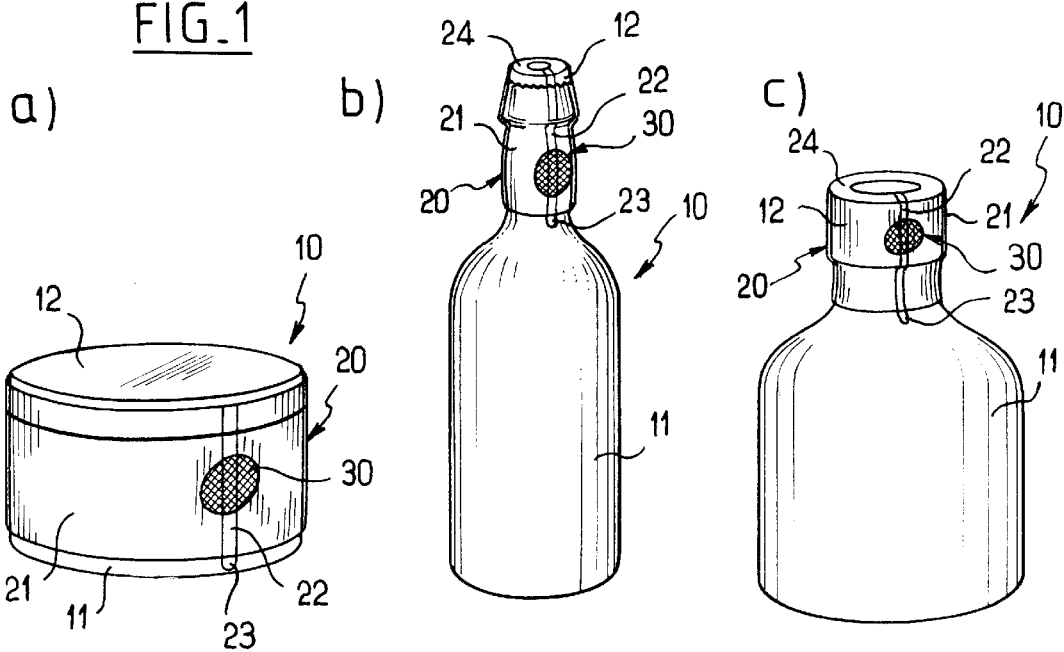
FIG. 1 shows various types of article, in this case receptacles having respective closure devices, that are fitted with respective security envelopes having holographic elements that are transferable onto a wall of the corresponding article, in accordance with the invention.

FIG. 1 shows several types of article by way of example, the articles in this case being receptacles given reference 10, all of them being provided with a respective security envelope 20 of the type constituted by a sleeve 21 of heat-shrink plastics material closely surrounding a portion of the article. Specifically, the articles are receptacles having closure devices, and each sleeve 21 surrounds a portion of each receptacle in its closure device zone, so as to make it tamperproof.

In a) there is shown a receptacle whose body 11 is surmounted by a cap 12, possibly a screw cap, while in b) the receptacle 10 is in the form of a bottle whose body 11 is surmounted by a crown cap 12, and c) shows a receptacle 10 in the form of a flask whose body 11 is surmounted by a stopper 12 that is screw-fastened or snap-fastened. In all of these cases, the receptacle 10 is fitted with a security envelope 20 heat-shrunk onto its wall, closely surrounding the portion of the receptacle that corresponds to its closure device zone. For the receptacles shown at b) and c), an envelope can be seen whose top margin provides a ring referenced 24 that covers the top face of the cap or stopper 12.

Naturally, the examples shown in FIG. 1 are purely by way of illustration, and the invention is not limited in any way to one particular type of article, and when the article is a receptacle, the invention is not limited to one particular type of closure device. In the description below, reference is made to an application to receptacles having a closure device, but that is solely by way of example.

On its inside face, the sleeve 21 is fitted with a holographic element 30 and with a tear strip 22 passing behind said holographic element so as to tear said element when the security envelope 20 is opened by pulling on said strip. In FIG. 1, a holographic element 30 is shown in the form of a substantially circular patch, however the invention is naturally not limited in any way to this particular shape of holographic element. In this case, the tear strip has an end for grasping given reference 23 on which the user can pull to open the safety envelope 30.

As explained in greater detail below, and in accordance with an essential characteristic of the invention, the holographic element 30 is organized to be transferable onto the facing wall of the article 10 and to adhere to said wall via zones situated on either side of the tear strip 22 so as to hold a portion of said tear strip captive.

In FIG. 1, the holographic element 30 is transferred onto a predetermined portion of the receptacle, and more precisely onto the side wall of the body 11, in this case in the vicinity of the stopper or cap 12, for the receptacles shown at a) and b), and on the side wall of the stopper or cap 12 itself for the receptacle shown at c).

In the situation where the security envelope is shrunk onto the article, as shown in the examples of FIG. 1, it is not possible to see by visual inspection that the holographic element which can be seen by transparency has, in fact, been transferred onto the wall of the article. However, after the security envelope has been opened in the normal manner, residual portions of the transferred holographic element remain on the article, thereby providing the desired function of certifying origin, like a genuine seal.

Figure 2:
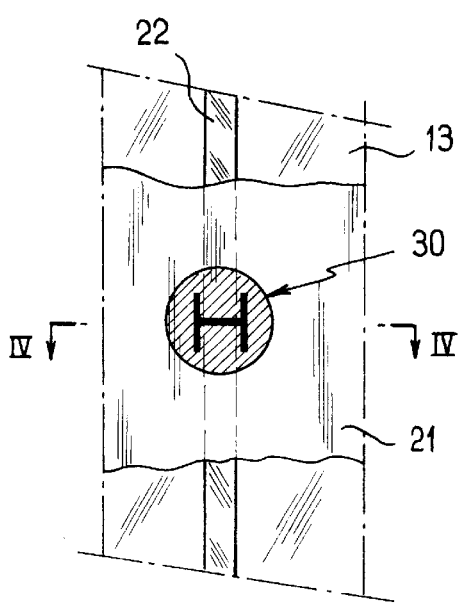
FIG. 2 is a fragmentary detail view showing the zone of the holographic element when the security envelope is shrunk onto the article.
Figure 3:
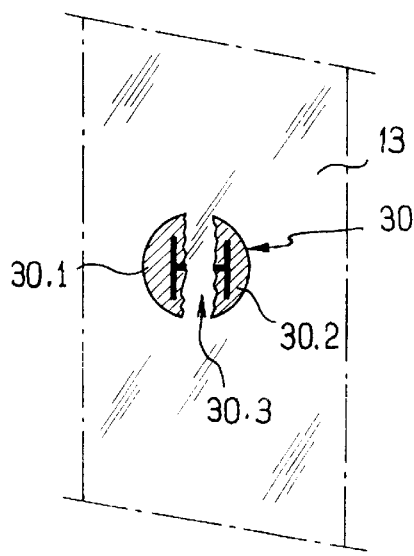
FIG. 3 should be compared with FIG. 2 and shows the same situation after the security substrate has been withdrawn by exerting traction on the tear strip, thus leaving a residual portion of the holographic element on the wall of the article after the element has been torn by the tear strip.

FIGS. 2 and 3 show normal destruction of the holographic element 30 as transferred onto the article after the strip 22 has been pulled away:

FIG. 2: the sleeve 21 is pressed against the wall referenced 13 of the article, and the holographic element 30 can also be seen, in this case illustrated in the form of a patch carrying the letter H, together with the tear strip 22 which goes behind the holographic element 30, and being over its entire length in direct contact with the wall 13 of the article. As stated above, the holographic element 30 adheres to the wall 13 of the article via portions thereof that are located on either side of the tear strip 22. The section of FIG. 4 shows clearly how the various components of the security envelope 20 are stacked in succession where they are pressed closely against the wall of the article 10;

FIG. 3: once the tear strip has been pulled to open the security envelope, portions referenced 30.1 and 30.2 of the holographic element 30 remain on the wall 13 of the article with an irregular gap referenced 30.3 that results from the tearing performed by the tear strip when traction is exerted thereon. In FIG. 3, it can be seen that the letter H is thus cut in two in a manner that is clearly visible to an observer.

In the event of fraudulent or abnormal manipulation of the security envelope 20 shrunk onto the article 10, such manipulation will automatically cause the tear strip 22 to be displaced, and will consequently destroy in entirely visible manner a portion of the transferred holographic element 30 while leaving portions of the holographic element on the wall of the article, e.g. as shown in FIG. 3. This makes the task of a dishonest person considerably more complicated insofar as the person must begin by scraping off the residual portions of the holographic element as transferred to the wall of the article, and must then put a new envelope into place carrying a holographic element with its tear strip, but under such circumstances, proof of the manipulation will be immediately detected on subsequently opening the security envelope merely by observing that the torn holographic element remains attached to the envelope after it has been opened. It is possible to select powerful transfer adhesives that make it very difficult mechanically or chemically to remove all traces of the transferred holographic element still present on the article: this further reinforces the protection conferred.

Figure 4:
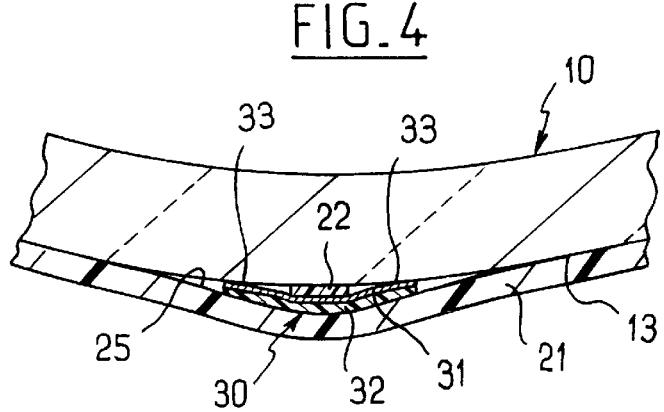
FIG. 4 is a detail section on line IV—IV of FIG. 2.

FIG. 4 shows the sandwich organization of the various components of the security envelope 20 of the invention in greater detail. The structure of the holographic element 30 is represented by a support layer 32 of transparent plastics material adhering to the inside face, referenced 25, of the sleeve 21, and a layer referenced 31 of holographic metallization carried by said support layer 32. Unlike known techniques, the layer 31 of holographic metallization is transferable and it adheres via zones 33 situated on either side of the tear strip 22 to the wall 13 of the article 10, thereby holding a portion of said tear strip captive.

Figure 5:
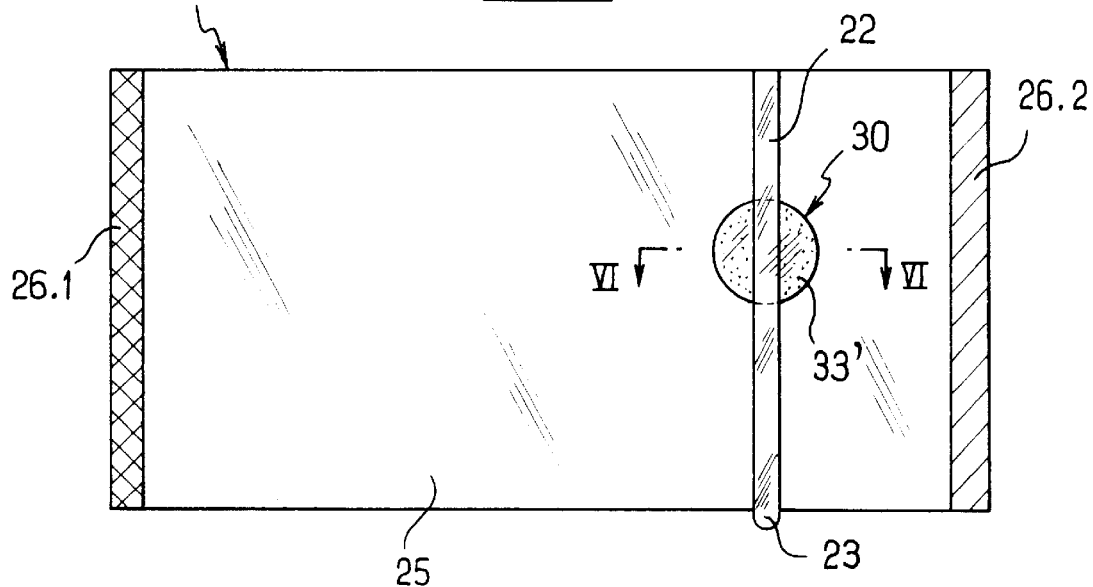
FIG. 5 is a plan view of the developed inside surface of the sleeve constituting the envelope, with its transferable holographic element and its tear strip.

When the sleeve 21 is flat, its inside face 25 has the configuration shown in FIG. 5. In this figure, it can be seen that the holographic element 30 is present with a layer 33' on its free face constituted by a layer of reactivatable adhesive, in particular a heat-reactivatable adhesive, together with the tear strip 22 which passes behind the holographic element, i.e. in front of it for an observer looking at the inside face of the wall. There can also be seen two end strips 26.1 and 26.2 which are superposed when the sleeve is formed, with the overlap zone corresponding to sealing that serves to form said sleeve.

Figure 6:
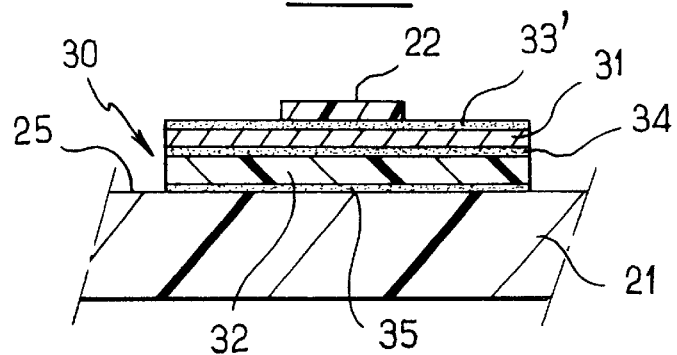
FIG. 6 is a section on VI—VI of FIG. 5, on a larger scale, showing more clearly the multilayer structure of the holographic element associated with the inside wall of the sleeve of heat-shrink plastics material.

FIG. 6 shows more clearly the multilayer structure of the transferable holographic element 30 which is associated with the inside wall 25 of the sleeve 20 of heat-shrink plastics material.

In conventional manner, the holographic element 30 comprises a layer 31 of holographic metallization carried by a support layer 32 of transparent plastics material, which layer adheres to the inside face 25 by means of a thin layer of adhesive 35, e.g. a transparent heat-stick varnish. By way of example, the support layer 32 can be made out of polyethylene or out of polyethylene terephthalate.

Unlike known holographic elements, the layer 31 of holographic metallization firstly presents a layer 33' of reactivatable adhesive on its free face, and secondly is bonded to the support layer 32 by a transfer bonding layer 34 enabling the layer 31 of holographic metallization to be totally or partially dissociated for transfer onto the wall 13 of the article and for sticking to said wall when the adhesive layer 33' is reactivated. After said layer 33' has been reactivated, in particular by heat if a heat-reactivatable adhesive is used, the layer 33' of reactivatable adhesive then confers adhesion to the free face of the layer 31 of holographic metallization relative to the wall of the article that is greater than the supporting force given by the transfer bonding layer 34, which layer can be constituted in the form of a transfer varnish, e.g. based on repulsive agents (where such varnishes are also known as "release" varnishes). Thus, if a heat reactivatable adhesive is used, the heat accompanying heat shrinking of the sleeve 21 has the effect of reactivating the adhesive layer 33' which causes the layer 31 of holographic metallization to adhere intimately on the wall of the article. Because of the transfer bonding layer 34, any fraudulent manipulation of the envelope will automatically have the effect of separating the holographic metallization layer 31 from the support layer 32 via the transfer bonding layer 34, thus enabling the tear strip 22 to give rise to forces that will destroy the holographic element 30.

Transfer of the holographic element 30 can be total, in which case the heat reactivatable adhesive layer 33' covers the entire free face of the layer 31 of holographic metallization. In a variant, it can apply to a portion only with the transferred portion of the holographic element optionally being organized to present a predetermined pattern. In which case, after the security envelope has been removed, the transferred portion of the pattern is to be found on the article, while the non-transferred portion comes away with the torn envelope.

The tear strip 22 is preferably of a width that is sufficient to destroy the transferred holographic element 30 over a wide gap (gap referenced 30.3 in FIG. 3), thereby making fraudulent manipulation easier to see.

The holographic element 30, or more precisely its layer 31 of holographic metallization may have an appearance that is mostly silver-colored or gold-colored, thereby making it easier to see the transferred portion of said holographic element.

FIG. 7 shows a variant in which the holographic element 30 is specially shaped to extend astride the line of separation between the body 11 and the stopper or cap 12 of the article 10 so that when the sleeve 21 is heat-shrunk, the element is transferred both onto the side wall of the body 11 and onto the side wall of the stopper or cap 12. Any fraudulent attempt at opening it is then certain to be detected. Specifically, the holographic element is elongate in shape (like a bone) defining two patches 30.4 and 30.5 interconnected by a ligament 30.6, with the patch 30.4 being transferred to the side wall of the body 11 and the patch 30.5 onto the side wall of the stopper or cap 12. The ligament 30.6 forms an intermediate link and any accidental or fraudulent breaking thereof is automatically visible: this further reinforces the security provided.

Also, although the above description is of security envelopes that are fitted with respective single holographic elements, a single sleeve could naturally be provided with a plurality of transferable holographic elements 30 together with a tear strip 22 passing behind each holographic element. Depending on circumstances, it is possible to envisage a single tear strip passing behind each of the holographic elements used, or else a plurality of tear strips so as to cause at least one holographic element to be destroyed in the event of the envelope being subjected to fraudulent manipulation.

FIG. 8 shows one such variant having two holographic elements 30, one of which is transferred to the side wall of the receptacle body 11 and the other of which is transferred to the side wall of the stopper or cap 12. Specifically, the two transferred holographic elements and the common tear strip 22 which passes behind them are disposed on a common generator line of the sleeve 21. The portion of the tear strip 22 which interconnects the two holographic elements 30 constitutes an intermediate ligament such that breakage thereof will automatically show up on one and/or the other of the holographic elements: this provides duplicate security.

It is also possible to use the envelope of the invention to facilitate traceability of a product by appropriate marking, e.g. by using laser radiation.

FIG. 9 shows one such possibility: the holographic element 30 and the adjacent zone of the sleeve wall 21 shrunk onto the article 10 present local marking 40 (symbolized in this case by the letters XY) made by radiation such as that from a laser. This localized marking 40 can be a code or a number (preferably a serial number), thereby further personalizing the product, and providing product traceability.

If it is desired to go further, and also mark the article, provision can be made, as shown in FIG. 10, for the holographic element 30 to have a window 41 that allows the adjacent zone of the wall 30 of the article 10 to be marked as well. This provides triple indelible marking by bombarding the heat-shrunk sleeve from the outside, and centering the radiation on the window 41 thus further improving the guarantee of authenticity, and without in any way modifying the quality with which the holographic element 30 is transferred onto the wall of the article. Local magnification shows the laser marking performed in the window 41 more clearly, in this case by means of the number 1234 which overlaps the edges of the window 41 and the side edges of the tear strip 22, thereby providing extremely effective protection against counterfeiting (it is practically impossible to reproduce the removed portions exactly in register).

Finally, in another variant (not shown in the figures) it is possible to provide for the tear strip 22 also to carry a metal filament which extends in the long direction of said strip, the filament constituting an antenna associated with an electronic system providing surveillance against theft and operating on a magnetic detection principle. For this particular technique, reference can usefully be made to the Applicants' document EP-A-0 698 562 which illustrates a tear strip fitted with a metal filament constituting an antenna that is associated with an electronic surveillance system.

The invention is not limited to the embodiments described above, but on the contrary covers any variant using equivalent means to reproduce the essential characteristics specified above.

What is claimed is:

1. A security envelope for an article, in particular a receptacle having a closure device, the envelope being of the type constituted by a sleeve of heat-shrinkable material suitable for closely surrounding a portion of the article, said sleeve being also fitted on its inside face with a holographic element and a tear strip passing behind the holographic element so as to tear said element when the envelope is opened by pulling on said strip, wherein the holographic element is transferable onto the facing wall of the article and can adhere to said wall via adherence zones situated on either side of the tear strip while holding a portion of said tear strip captive, such that any fraudulent manipulation of the envelope once shrunk on the article has the effect of displacing the tear strip and thus visibly destroys the holographic element at said adherence zones thereof.

2. A security envelope according to claim 1, wherein said adherence zones of the holographic element are transferred in full onto the wall of the article when the sleeve is heat-shrunk.

3. A security envelope according to claim 1, wherein said adherence zones of the holographic element are transferred in part only onto the wall of the article when the sleeve is heat-shrunk, with a transferred part being in the form of a predetermined pattern.

4. A security envelope according to claim 1, for a receptacle whose closure device includes a stopper or cap surmounting a body of the receptacle, said body having a side wall, wherein the holographic element is transferred onto the side wall of the receptacle body during heat shrinking of the sleeve.

5. A security envelope according to claim 1, for a receptacle whose closure device includes a stopper or cap surmounting a body of the receptacle, said body having a side wall, wherein the holographic element is transferred onto the side wall of the stopper or cap during heat shrinking of the sleeve.

6. A security envelope according to claim 1, for a receptacle whose closure device includes a stopper or cap surmounting a body of the receptacle, said body having a side wall, wherein the holographic element is transferred both onto the side wall of the receptacle body and onto the side wall of the stopper or cap during heat shrinking of the sleeve.

7. A security envelope according to claim 1, for a receptacle whose closure device includes a stopper or cap surmounting a body of the receptacle, said body having a side wall, wherein the holographic element is elongate in shape defining two patches interconnected by a ligament, with one patch being transferred onto the side wall of the receptacle body and one patch being transferred onto the side wall of the stopper or cap.

8. A security envelope according to claim 1, wherein the holographic element has a window making it possible also to print a local marking onto an adjacent zone of the facing wall of the article.

9. A security envelope according to claim 1, in which the holographic element fitted to the sleeve comprises a layer of holographic metallization carried by a support layer of transparent plastics material adhering to the inside face of said sleeve, wherein the layer of holographic metallization presents, on its free face, a layer of reactivatable adhesive, and said layer of holographic metallization is bonded to the support layer by a transfer bonding layer enabling said layer of holographic metallization to be totally or partially dissociated therefrom for transfer onto the wall of the article, and enabling it to be stuck to said wall when the adhesive layer is reactivated.

10. A security envelope according to claim 9, wherein the adhesive layer provided on the free face of the layer of holographic metallization is reactivatable by heat.

11. A security envelope according to claim 1, wherein the tear strip is of a width sufficient to destroy the transferred holographic element by forming a wide gap, thereby facilitating visual detection of fraudulent manipulation.

12. A security envelope according to claim 1, wherein the tear strip also carries a metal filament extending lengthwise relative to said strip, said filament constituting an antenna associated with an electronic system for surveillance against theft and operating on a magnetic detection principle.

13. A security envelope according to claim 1, wherein the holographic element is of an appearance that is predominantly silver-colored or gold-colored.

14. A security envelope according to claim 1, wherein the sleeve is fitted with a plurality of transferable holographic elements together with a tear strip passing behind each holographic element.

15. A security envelope according to claim 14, for a receptacle whose closure device includes a stopper or cap surmounting a receptacle body, said body having a side wall, wherein, during heat shrinking of the sleeve, one holographic element is transferred onto the side wall of the receptacle body and another holographic element is transferred onto the side wall of the stopper or cap.

16. A security envelope according to claim 15, wherein the two transferred holographic elements and the common tear strip are disposed on a common generator line of the sleeve.

17. A security envelope according to claim 8, wherein said marking comprises a code.

* * * * *